No. 666,068. Patented Jan. 15, 1901.
E. SARVELA.
DRIVING AND BRAKING MECHANISM FOR BICYCLES.
(Application filed June 18, 1900.)
(No Model.) 2 Sheets—Sheet 1.
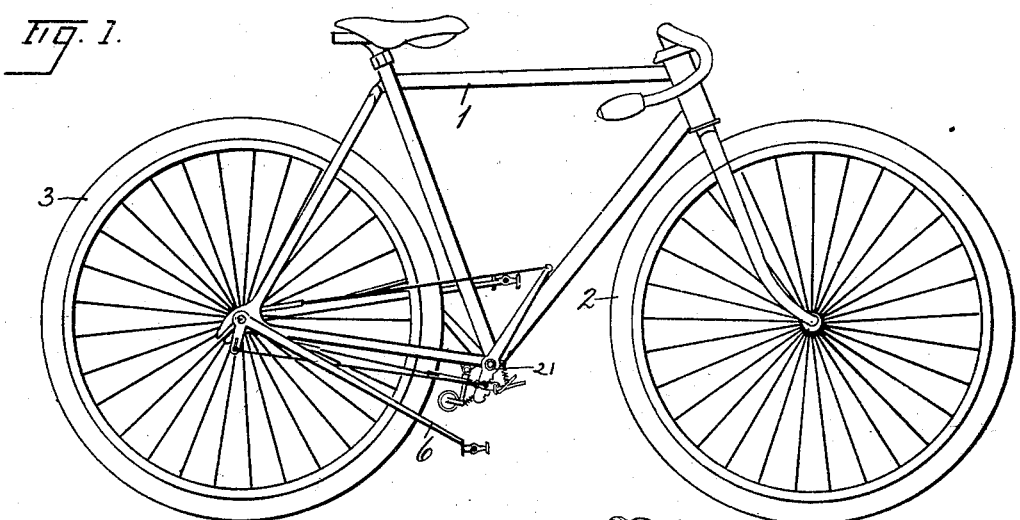
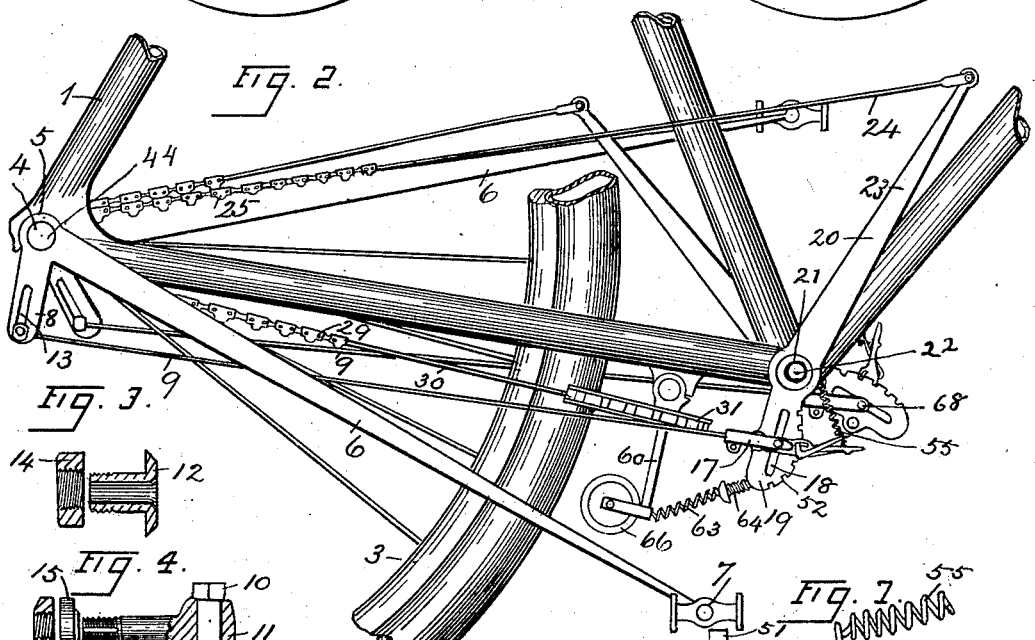
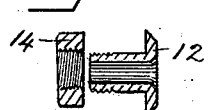
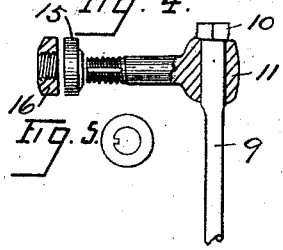
WITNESSES:
W. D. Daniels
Florence H. Wigand.
INVENTOR.
Ed. Sarvela
BY Francis M. Wright,
ATTORNEY.

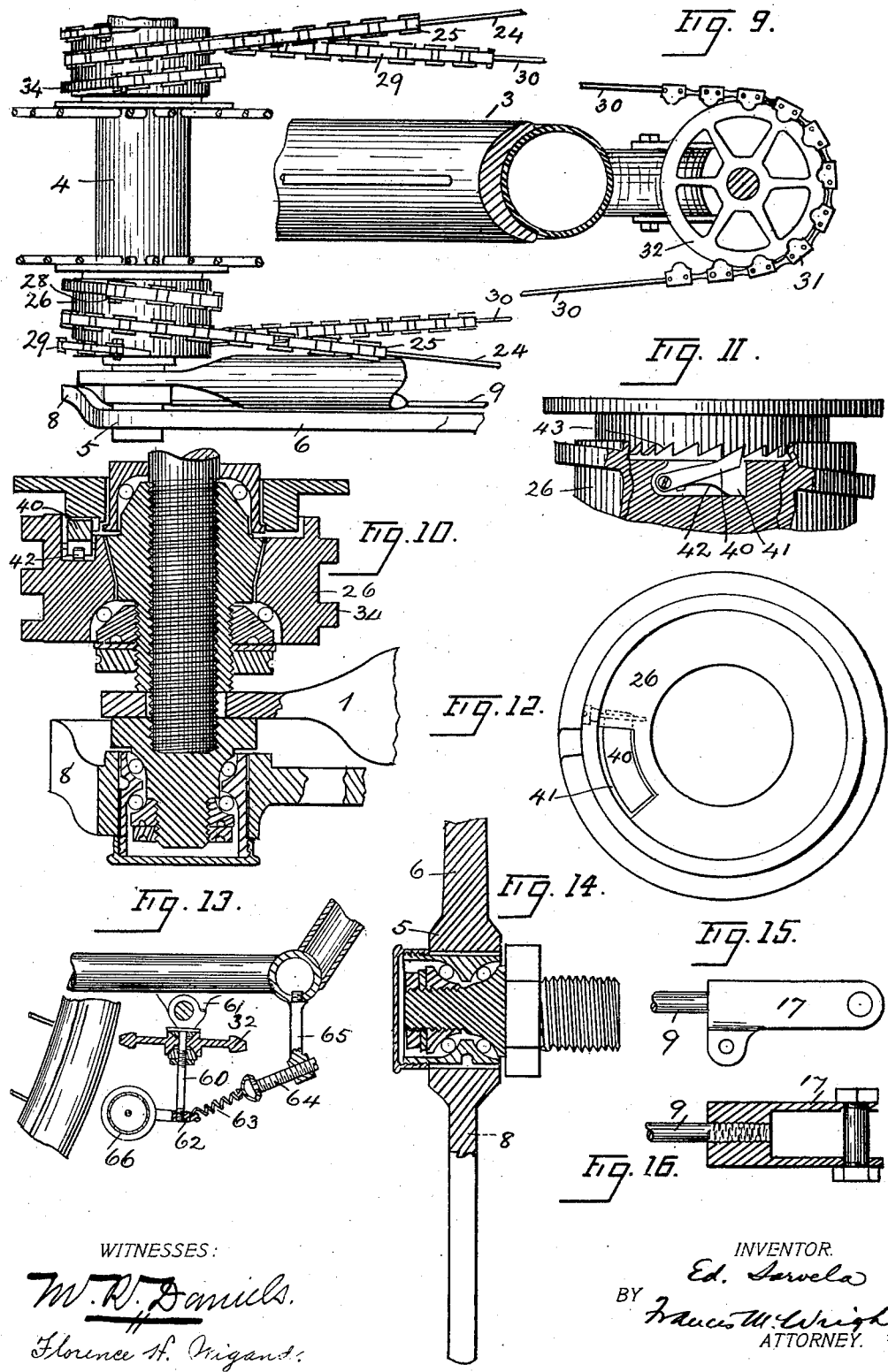

UNITED STATES PATENT OFFICE.

EDVARD SARVELA, OF WHITESBOROUGH, CALIFORNIA.

DRIVING AND BRAKING MECHANISM FOR BICYCLES.

SPECIFICATION forming part of Letters Patent No. 666,068, dated January 15, 1901.

Application filed June 18, 1900. Serial No. 20,768. (No model.)

*To all whom it may concern:*

Be it known that I, EDVARD SARVELA, a subject of the Emperor of Russia, residing at Whitesborough, in the county of Mendocino and State of California, have invented certain new and useful Improvements in Driving and Braking Mechanism for Bicycles, of which the following is a specification.

My invention relates to improvements in driving and braking mechanism for bicycles; and the objects of my invention are to provide a mechanism by which the power can be applied to propel the bicycle with greater advantage and economy of power than with those at present in use; also, to provide means whereby the propelling mechanism may be geared rapidly and conveniently to a high speed or to a low speed, as may be desired, according to the character of the road to be traversed, and also to provide an improved form of braking mechanism in connection with my improved propelling mechanism.

My invention therefore resides in the novel construction, combination, and arrangement of parts for the above ends hereinafter fully specified, and particularly pointed out in the claims.

In the accompanying drawings, Figure 1 is a side elevation of a bicycle equipped with my improvements. Fig. 2 is a side elevation of the novel mechanism of my invention on an enlarged scale. Figs. 3, 4, 5, 6, 7, and 8 are details of small parts of the mechanism. Fig. 9 is an enlarged broken plan view, partly in sections, showing a portion of the propelling mechanism. Fig. 10 is a horizontal section through the rear axle, enlarged. Fig. 11 is a partially-broken top plan view of a sleeve on the rear axle. Fig. 12 is a side view of one of the sleeves. Fig. 13 is a vertical section showing the braking mechanism. Fig. 14 is a central section through a lever of the propelling mechanism, and Figs. 15 and 16 are details.

Referring to the drawings, it will be seen that 1 represents the frame of the bicycle; 2, the front wheel, and 3 the rear wheel, thereof. Upon the axle 4 of the rear wheel, at each end thereof, is loosely pivoted a lever 5, the long arm 6 of which carries at its front end a treadle 7, while the short arm 8 has attached thereto a wire rod 9. Said rod 9 has formed at its rear end a head 10 and is thereby held in an eyebolt 11, passed through a sleeve 12, the sleeve 12 being clamped at any desired point in a slot 13 in the short arm 8 by means of a nut 14 and the eyebolt being secured in the sleeve 12 by means of the washer 15 and nut 16. The forward end of the rod 9 is clamped in a fork 17, which passes on each side of a short arm 19 of a lever 20, having a slot 18. Said fork 17 is maintained in any desired position in said slot by means hereinafter described. Said lever 20 is pivotally mounted in the lower end of the frame in the place of the usual crank-axle. The long arm 23 of said lever has connected thereto at its end a wire rod 24, the rear end of which is connected to a chain 25, which coils around a sleeve 26 and is secured at its rear end by a screw 28 to a projection on said sleeve. Upon said sleeve 26 is also secured in a similar manner the end of a chain 29, which passes rearwardly underneath said sleeve 26 and then over the same and forwardly, being connected by a wire 30 to a chain 31, which passes around a horizontal wheel 32, pivotally supported in the manner hereinafter described, the other end of said chain being attached to a second wire 30, extending rearwardly and connected at its rear end with a second chain 29 upon a second sleeve 26 on the other end of the rear axle.

The construction is precisely the same on both sides of the wheel. The chains 25 and 29 are formed with links constructed to lap over spiral ribs 34, formed on the sleeves 26.

It is evident that upon depressing the treadle 7 upon one side of the wheel the arm 8 of the lever 5 will be rocked rearwardly, thus moving the wire rod 9 rearwardly, and thus moving the wire rod 24 forwardly, and thereby rotating the sleeve 26 forwardly, while at the same time the treadle on the opposite side of the wheel will be elevated through the medium of the wires 30 and the chain 31 around the wheel 32.

The reciprocating rotary motion of the two sleeve 26 is employed to produce a continuous rotary motion of the rear wheel 3, and this is accomplished by means of a dog 40, pivotally mounted in a recess 41 on the inner face of each sleeve 26 and normally pressed outward by means of a spring 42. The tooth of said dog 40 will when the sleeve is rotated in a forwardly direction engage one of an annular series of teeth 43 on the hub 44 of the rear wheel and will thereby impart a forward rotary motion to said wheel; but on the rearward reciprocation of the sleeve 26 the dog 40 will rotate freely past the teeth 43.

In order to change the gearing of the machine for climbing hills, the forks 17 may be moved up or down along the short arm 19 of the lever 20 to or from its pivot, so as to decrease or increase the leverage of said arm, and thereby correspondingly increase or decrease the amount of movement of the long arm of said lever. This may be done by the foot when riding, and for this purpose there is provided a shifting lever 47, pivoted at 48 on the rear side of the arm 19 and having a slot 49. A bolt 68 passes through the slot 49 and the slot 18 and holds the two together. Said lever has pivoted thereon a spring-actuated locking-lever 50, having a tooth 51, engaging a rack 52, formed on the front edge of the arm 19. By depressing with the foot the long arm 53 of the lever 50 the tooth 51 is released from the rack 52 and the shifting lever is free to move up or down. A spring 55 is attached to the said shifting lever and to the lever 20 and normally draws the shifting lever upward, said spring 55 being much more powerful than the spring 56 of the locking-lever. Thus by pressing with the foot upon the locking-lever with sufficient pressure of the spring 56, but not to overcome that of the spring 55, the shifting lever 47 will rise and move the fork 17 upward, and thus makes the bicycle high-geared. A down pressure sufficient to overcome both springs shifts the fork 17 downward and makes the bicycle low-geared.

The horizontal wheel 32 is pivotally mounted upon a vertical shaft 60, pivoted at the upper end upon a hanger 61, secured upon the under side of the frame of the machine. The lower end of said shaft 60 is screwed into a fork 62, to the forward end of which is attached a spring 63, adjustably connected by means of a threaded rod 64 to a hanger 65, secured in the under side of the bearing for the shaft 22. The fork carries at its rear end a friction-roller 66 in close proximity to the tire of the rear wheel. The spring 63 will be of sufficient strength to prevent rearward movement of the wheel 32 when downward pressure is exerted on only one of the treadles. In that case the pressure will have the effect only of drawing the chain 31 around the horizontal wheel 32 without its moving rearwardly; but when both feet are pressed down upon the treadles then the effect will be to move the said wheel rearwardly, and thereby also move the roller 66 into contact with the tire of the rear wheel to act as a brake.

I claim—

1. In a bicycle, the combination of levers pivoted on the rear axle, having forwardly-extending long arms and downwardly-extending short arms, treadles carried on the long arms of the levers, levers pivoted on the bicycle-frame in front of the rear wheel having upwardly-extending long arms and downwardly-extending short arms, links and terminal connections thereof for connecting the short arms of the first levers with the short arms of the second levers, the terminal connections on the short arms of the second levers being movable along said latter short arms, spring-actuated levers for holding said connections in any desired position on said arms, the long arms of said latter levers extending forwardly from their pivots and arranged to be moved downwardly by the feet to release said connections, sleeves on the rear axle, automatic clutches between said sleeves and axle, and connections from the levers pivoted on the bicycle-frame to rotate said sleeves, substantially as described.

2. In a bicycle, the combination of levers pivoted on the rear axle, treadles carried on the long arms of said levers, levers pivoted on the bicycle-frame in front of the rear wheel, connections between said levers and the levers on the rear axle, sleeves on the rear axle, automatic clutches between said sleeves to rotate the same, a vertical shaft pivotally mounted in front of the rear wheel, a horizontal wheel on said shaft, a chain around said wheel connected with both of said sleeves, a friction-roller carried by the vertical shaft, and a spring resisting said shaft, substantially as described.

In witness whereof I have hereunto set my hand in the presence of two subscribing witnesses.

EDVARD SARVELA.

Witnesses:
FRANCIS M. WRIGHT,
M. R. DANIELS.